United States Patent
Legault et al.

(10) Patent No.: US 10,865,879 B2
(45) Date of Patent: Dec. 15, 2020

(54) SECONDARY PARK LOCK ACTUATOR

(71) Applicant: Dura Operating, LLC, Auburn Hills, MI (US)

(72) Inventors: David Legault, Grosse Pointe Farms, MI (US); John Sayeau, Oxford, MI (US)

( * ) Notice: Subject to any disclaimer, the term of this patent is extended or adjusted under 35 U.S.C. 154(b) by 34 days.

(21) Appl. No.: 16/047,222

(22) Filed: Jul. 27, 2018

(65) Prior Publication Data

US 2020/0032903 A1 Jan. 30, 2020

(51) Int. Cl.
*F16H 63/34* (2006.01)
*F16C 1/18* (2006.01)

(52) U.S. Cl.
CPC .......... *F16H 63/3491* (2013.01); *F16C 1/18* (2013.01)

(58) Field of Classification Search
CPC .............................. F16H 63/3491; F16C 1/18
See application file for complete search history.

(56) References Cited

U.S. PATENT DOCUMENTS

| | | | |
|---|---|---|---|
| 5,827,149 A * | 10/1998 | Sponable | F16H 63/3466 477/92 |
| 6,378,393 B1 | 4/2002 | Bates | |
| 6,481,556 B1 | 11/2002 | Haupt | |
| 9,004,254 B2 | 4/2015 | Jang et al. | |
| 9,062,752 B2 | 6/2015 | Fournier | |
| 9,139,170 B2 | 9/2015 | Albertson et al. | |
| 9,423,019 B2 | 8/2016 | Albertson et al. | |
| 2002/0066623 A1 | 6/2002 | Powrozek | |
| 2007/0209903 A1 | 9/2007 | Hayashi et al. | |
| 2009/0229388 A1 * | 9/2009 | Lee et al. | B60H 1/00578 74/89.22 |
| 2014/0326101 A1 | 11/2014 | Han et al. | |

FOREIGN PATENT DOCUMENTS

WO WO2017003481 A1 1/2017

* cited by examiner

*Primary Examiner* — Vicky A Johnson
(74) *Attorney, Agent, or Firm* — Vivacqua Crane PLLC (57) ABSTRACT

In at least some implementations, a park lock release actuator includes a housing, a drive member and a retainer. The drive member is received at least partially within the housing for rotation about an axis relative to the housing between a first position and a second position. The retainer has a first position in which rotation of the drive member is prevented and a second position in which rotation of the drive member is permitted. At least one of the retainer and the drive member moves relative to the housing in a direction different from the rotation of the drive member so that the path of motion of the retainer between the first position and second position of the retainer is different from the path of motion of the drive member between the first position and second position of the drive member.

15 Claims, 12 Drawing Sheets

SECONDARY PARK LOCK ACTUATOR

TECHNICAL FIELD

The present disclosure relates generally to an actuator to move a vehicle transmission park lock or park lever.

BACKGROUND

Some vehicles use a transmission park lock that is carried by the transmission to retain the transmission in park until certain driver actions are taken to shift the transmission from park. For example, a vehicle key may need to be in a proper location and a vehicle brake pedal may need to be depressed before the park lock is released. The park lock is electrically actuated. If electrical power is lost to the vehicle, or to the electrical circuit of the vehicle from which electricity is supplied to the park lock, then the ability to electrically release the park lock is lost. In certain circumstances, it may be necessary to tow or otherwise move the vehicle. If power is lost when the park lock is engaged, towing or otherwise moving the vehicle is prevented or made more difficult.

SUMMARY

In at least some implementations, a park lock release actuator includes a housing, a drive member and a retainer. The drive member is received at least partially within the housing for rotation about an axis relative to the housing between a first position and a second position. The retainer has a first position in which rotation of the drive member is prevented and a second position in which rotation of the drive member is permitted. At least one of the retainer and the drive member moves relative to the housing in a direction different from the rotation of the drive member so that the path of motion of the retainer between the first position and second position of the retainer is different from the path of motion of the drive member between the first position and second position of the drive member.

In at least some implementations, the drive member has a tool engaging feature coaxial with the axis of rotation of the drive member. In at least some implementations, the retainer is fixed to the drive member, and the drive member is movable axially relative to the housing. In at least some implementations, the retainer moves relative to the drive member, and the retainer may move one of axially or radially or rotates/pivots relative to the drive member.

In at least some implementations, the retainer has a cam surface that displaces the retainer from the first position to the second position as the drive member is rotated. In at least some implementations, the retainer is fixed to the drive member, and the housing includes a cam surface that engages the retainer to, as the drive member is rotated, drive the drive member in said direction different from rotation of the drive member. In at least some implementations, the housing includes a first void in which the retainer is received when the drive member is in its first position, and a second void in which the retainer is received when the drive member is in its second position.

In at least some implementations, a cable has a conduit and a core received within the conduit, and the core is connected to the drive member so that the core is moved relative to the conduit when the drive member rotates relative to the housing.

In at least some implementations, a biasing member opposes movement of at least one of the retainer and the drive member in said direction different from rotation. In at least some implementations, the retainer is fixed to the drive member and the biasing member engages the drive member. In at least some implementations, the retainer moves relative to the drive member and the biasing member acts on the retainer.

In at least some implementations, the retainer is carried by the housing and the drive member includes a stop surface selectively engageable with the retainer when the retainer is in the first position and the drive member is in the first position. And the drive member may include a second stop surface engageable with the retainer when the retainer is in the first position and the drive member is in the second position.

In at least some implementations, a park lock release actuator includes a housing, a drive member, and a retainer. The drive member is received at least partially within the housing for rotation about an axis relative to the housing between a first position and a second position, and the drive member has a tool engaging feature coaxial with the axis of rotation of the drive member. The retainer has a first position in which rotation of the drive member is prevented and a second position in which rotation of the drive member is permitted. At least one of the retainer and the drive member moves relative to the housing in a direction different from the rotation of the drive member so that the path of motion of the retainer between the first position and second position of the retainer is different from the path of motion of the drive member between the first position and second position of the drive member.

In at least some implementations, the retainer is carried by the drive member. In at least some implementations, the retainer is carried by the housing.

In at least some implementations, a park lock release actuator, includes a housing, a drive member, a power transmission member, a stop feature and a retainer. The drive member is received at least partially within the housing for rotation about an axis relative to the housing between a first position and a second position, and the drive member has a tool engaging feature coaxially arranged with the axis. The power transmission member is coupled to the drive member for movement with the drive member and is adapted to also be coupled to the park lock so that rotation of the drive member from the first position to the second position releases the park lock. The stop feature is carried by one of the drive member and the housing. And the retainer is carried by the one of the drive member and the housing that does not carry the stop feature. The retainer has a first position in which the retainer engages the stop feature to prevent rotation of the drive member and a second position in which rotation of the drive member is permitted. At least one of the retainer and the drive member moves relative to the housing in a direction different from the rotation of the drive member so that the path of motion of the retainer between the first position and second position of the retainer is different from the path of motion of the drive member between the first position and second position of the drive member.

In at least some implementations, the stop feature is a first stop feature and wherein the actuator also includes a second stop feature, wherein the first stop feature is engageable by the retainer when the drive member is in the first position, and the second stop feature is engageable by the retainer when the drive member is in the second position.

BRIEF DESCRIPTION OF THE DRAWINGS

The following detailed description of some implementations of a shifter will be set forth with regard to the accompanying drawings, in which.

DETAILED DESCRIPTION

Figure 1:
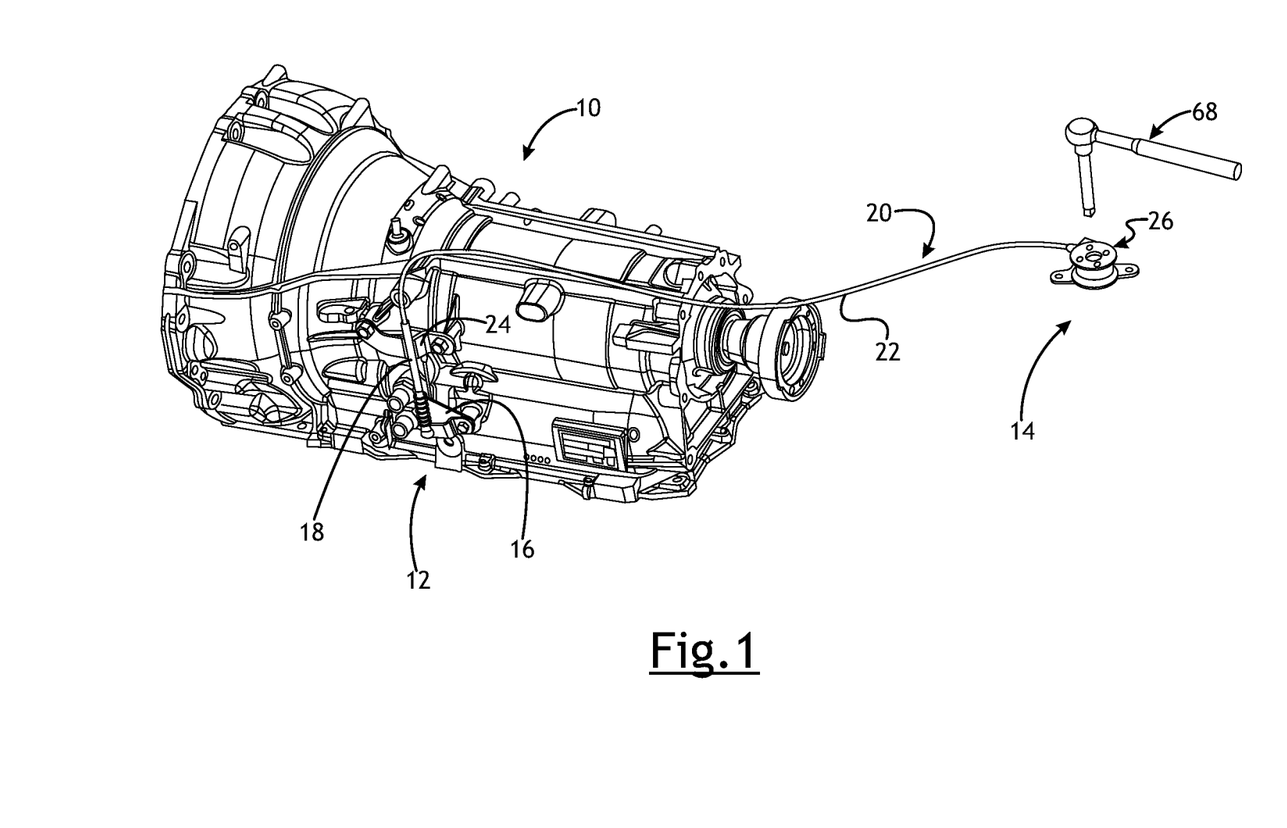
FIG. 1 is a perspective view showing a transmission with a park lock assembly, and a secondary actuator coupled to the park lock assembly.

Referring in more detail to the drawings, FIG. 1 illustrates a vehicle transmission 10 that includes a park lock assembly 12 and a secondary park lock actuator 14. The park lock assembly 12, when engaged, maintains the transmission 10 in park gear to prevent rolling movement of the vehicle until the vehicle is shifted out of park. Certain actions are sometimes required before the vehicle can be shifted out of park, including detection of a key in an ignition assembly, or detection of a key fob in the vehicle, and/or application of the vehicle brake pedal. When whatever prerequisite conditions are met, the park lock assembly 12 is disengaged and the transmission 10 may then be shifted out of park.

In at least some implementations, the park lock assembly 12 is driven between its engaged and disengaged states by an electrically powered primary park lock actuator. In the example shown, the park lock assembly 12 includes a lever 16 coupled to the transmission 10 for movement between a first position in which the park lock assembly is engaged to prevent shifting the transmission out of park, and a second position in which the park lock assembly is disengaged. The lever 16 is coupled to a shaft 18 that, in normal vehicle operation, is driven by the primary actuator to pivot the lever among its two positions.

If the primary, electrically powered actuator fails or if power to that actuator is lost, it may be desirable to permit the vehicle to be shifted out of park to, for example, facilitate towing the vehicle to a repair facility. To disengage the park lock assembly 12 without use of the electrically powered actuator, the secondary park lock actuator 14 may be manually manipulated as set forth herein.

In at least some implementations, the secondary actuator 14 may be mounted remotely from the transmission 10 and coupled thereto by a mechanical power transmission member, shown as a cable 20. The cable 20 may be a push-pull or Bowden style cable to facilitate driving the park lock assembly 12 to both of its engaged and disengaged positions. Such a cable 20 has a conduit 22 fixed at both ends, such as to a bracket 24 on the transmission 10 at one end and to a housing 26 of the secondary actuator 14 or an adjacent structure at its other end. The cable 20 also has a core 28 (FIGS. 2 and 3) slidably received for reciprocation within the conduit 22. The core 28 is coupled at one end to the park lock assembly 12, such as to the shaft 18, and at the other end the core 28 is coupled to a drive member 30 of the secondary actuator 14.

Figure 8:
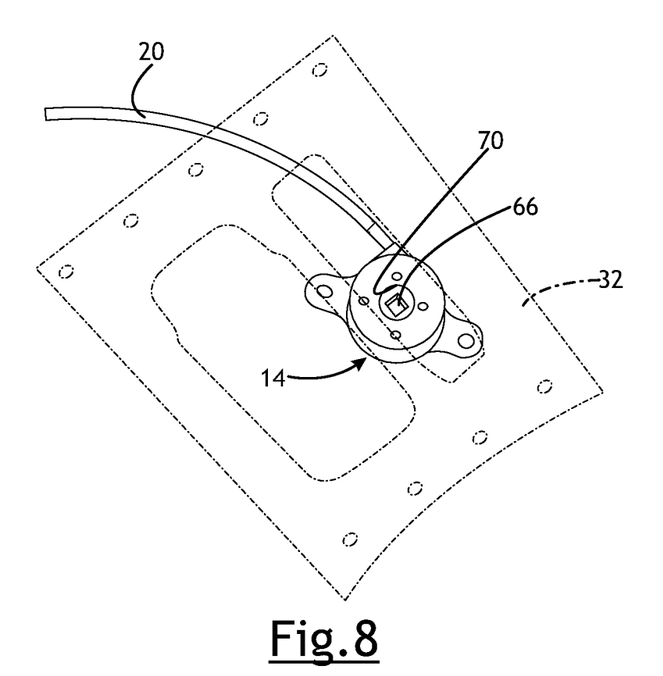
FIG. 8 is a perspective view showing the actuator in position beneath a vehicle trim piece.

The drive member 30 may be carried by or received within the housing 26 of the secondary actuator 14. The housing 26 may be located in any desired position within the vehicle, such as under a vehicle hood or, as shown in FIG. 8, behind or beneath an interior trim piece 32 for access to the secondary actuator 14 within a passenger compartment of the vehicle. The housing 26 may include a first portion, hereinafter referred to as the base 34, and a second portion, hereinafter referred to as a cover 36, that is coupled to the base at least partially enclosing the drive member 30.

Figure 2:
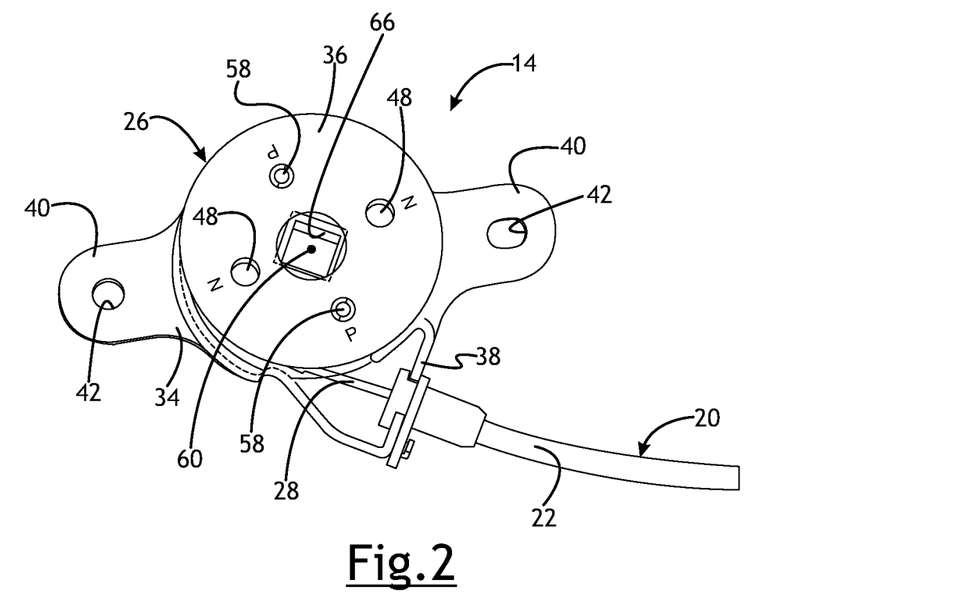
FIG. 2 is a view of the secondary actuator.
Figure 3:
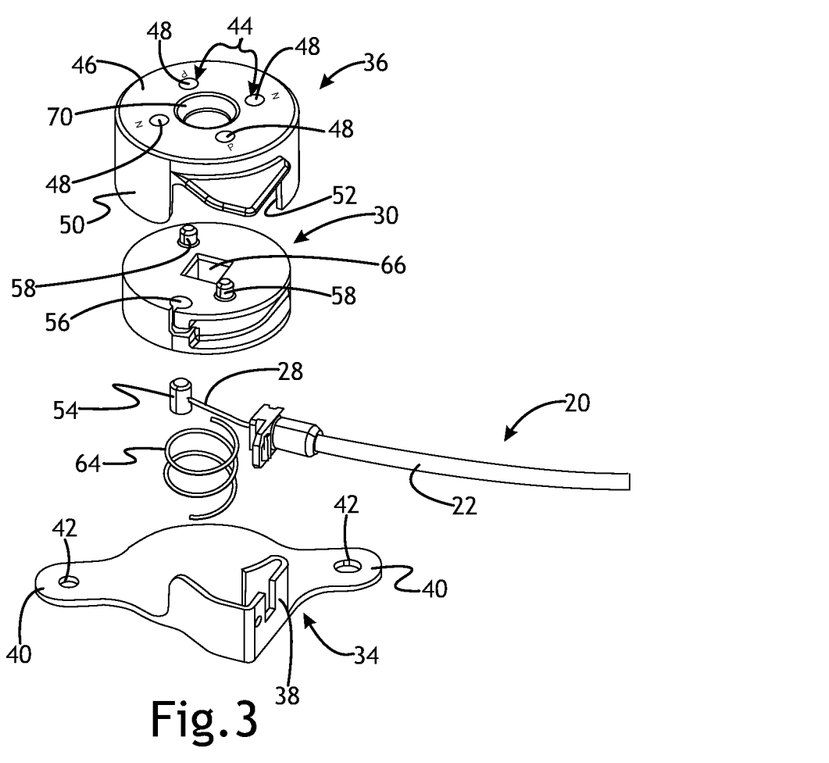
FIG. 3 is an exploded view of the actuator.
Figure 4:
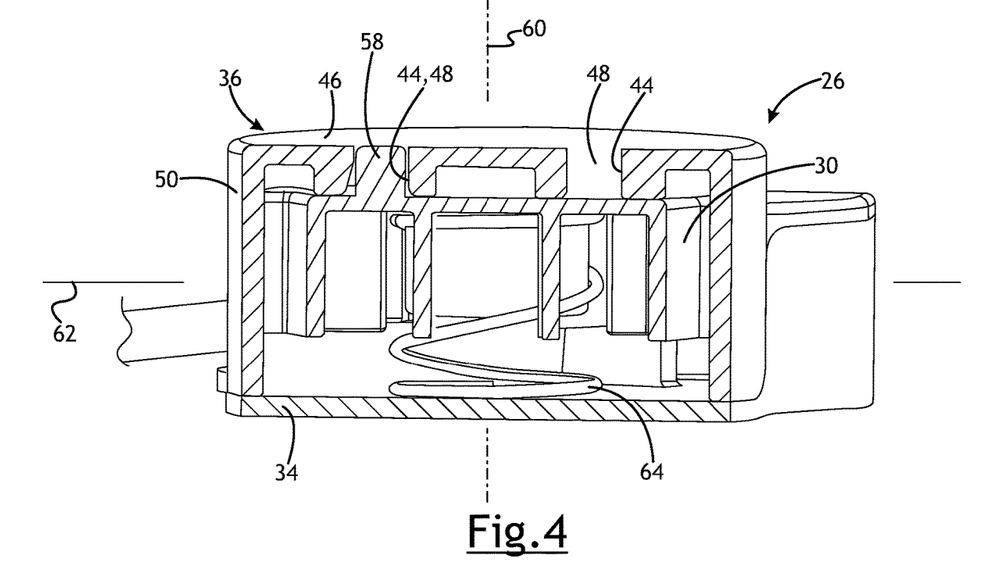
FIG. 4 is a cross-sectional view of the actuator.

As shown in FIGS. 2 and 3, the base 34 may include a bracket 38 to which the conduit 22 is coupled and one or more mounting features by which the housing may be secured to an adjacent structure in the vehicle. In the example shown, the mounting features includes outwardly extending flanges 40 with holes 42 to receive fasteners connecting the housing 26 to the adjacent structure.

Figure 7:
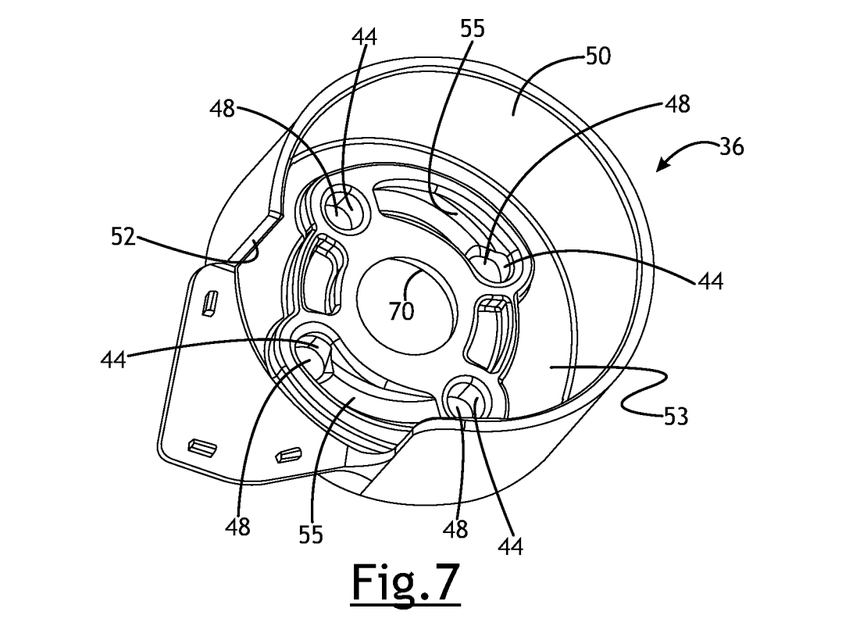
FIG. 7 is a bottom perspective view of a cover of a housing of the actuator.

As shown in FIGS. 3 and 7, the cover 36 may include one or more stop features 44 arranged to be selectively engaged by the drive member 30 to releasably retain the position of the drive member. In the example shown, the cover 36 includes an upper wall 46 including one or more voids 48 the borders of which define the stop features 44. The cover 36 may also include a sidewall 50 that extends between the upper wall 46 and the base 34. The sidewall 50 may be generally cylindrical and may include a recess 52 to accommodate the bracket 38 of the base 34. Of course, the bracket 38 could instead or in addition be formed in the cover 36. That is, the bracket 38 could be formed in the base 34, the cover 36 or partially in each of the base and cover, as well as being formed in or by another component separate from the housing 26, as desired. As shown in FIG. 7, the bottom surface 53 of the upper wall 46 may include arcuate guide tracks 55 extending from one or more of the voids 48.

Figure 5:
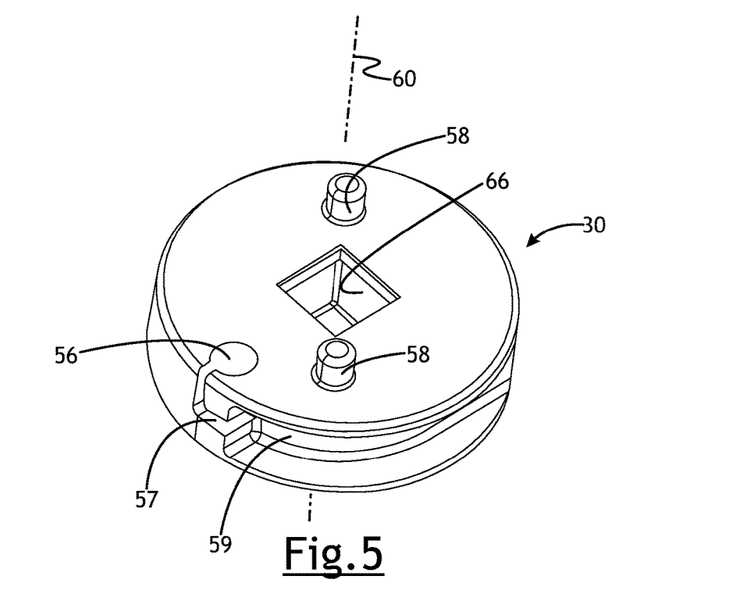
FIG. 5 is a top perspective view of a drive member of the actuator.
Figure 6:
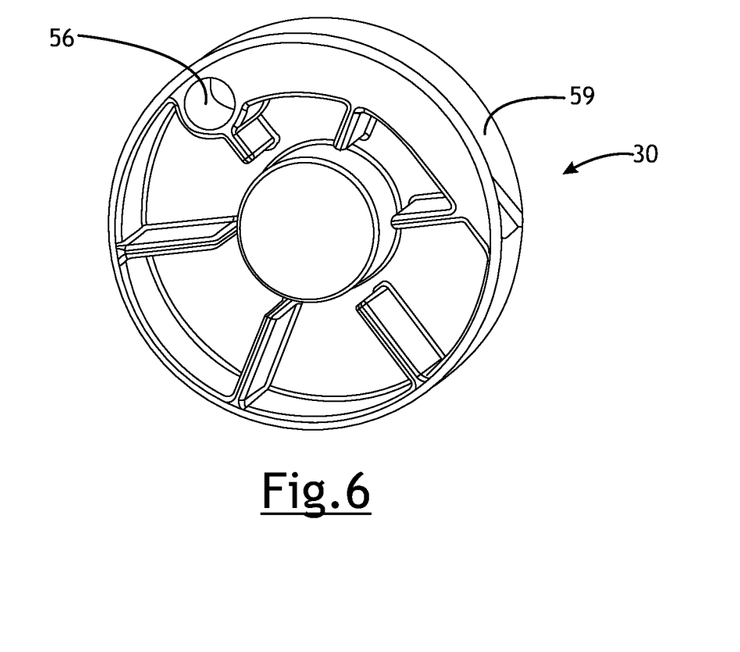
FIG. 6 is a bottom perspective view of the drive member.

The drive member 30 may be received at least partially within the housing 26 and is movable relative to the housing between a first position and a second position. To move the cable core 28 relative to the conduit 22 and thereby change the state of the park lock assembly 12, the core is coupled to the drive member 30. Hence, movement of the drive member 30 relative to the housing 26 moves the core 28 relative to the conduit 22 to change the state or the park lock assembly 12. In at least some implementations, as shown in FIG. 3, a fitting 54 is fixed to the core 28 and the drive member 30 includes a coupling feature, such as a void or cavity 56, best shown in FIGS. 3, 5 and 6, in which the fitting 54 is received so that the fitting and core 28 move when the drive member 30 moves. A slot 57 may extend from the cavity 56 and lead to a take-up track 59 formed in the drive member 30 to accommodate, route and take up the core as the drive member rotates in one direction.

As shown in FIGS. 2-5 and 9-11, to prevent inadvertent or unintentional movement of the drive member 30, a retainer 58 may be carried by the drive member and may be selectively or releasably engaged with a stop feature 44 of the housing 26 to selectively prevent movement of the drive member relative to the housing. The retainer 58 may have a first position in which the retainer is engaged or engageable with (e.g. aligned with relative to the path of movement of the drive member) the stop feature 44 of the housing 26 and a second position in which the retainer 58 is clear of and will not engage the stop feature 44 to permit a desired movement of the drive member.

In at least some implementations, two retainers 58 are carried by the drive member 30, generally diametrically opposed, to balance forces across the drive member. The retainers 58 may extend axially from the drive member 30 for receipt in axially arranged stop features 44, shown as voids 48 in the housing cover 36. To permit the rotary position of the drive member 30 to be positively retained in both positions of the drive member, the housing 26 may include a first void 48 (or first set of voids, with one void for each retainer 58 where multiple retainers are provided) in which the retainer 58 is received in the first rotary position of the drive member 30 and a second void 48 (or second set of voids) in which the retainer 58 is received in the second rotary position of the drive member. The voids thus define first and second stop features engageable with the retainer(s) in the different positions of the drive member so that the second actuator 14 can be positively retained in the first position in which the park lock assembly 12 is in its engaged state, and also in the second position in which the park lock assembly is in the disengaged state.

In at least some implementations, the direction of movement of the retainer 58 between its first and second positions is different than the direction of movement of the drive member 30 between its first and second positions. Thus, to actuate the drive member 30, the retainer 58 must be moved from its first position to its second position, and then the drive member 30 may be moved from its first position to its second position, or from its second position to its first position.

In the example shown in FIGS. 2-11, the retainer 58 is fixed to and moves with the drive member 30. Hence, the drive member 30 is movable in two different directions, or along two different paths of motion, relative to the housing 26. In at least some implementations, the first direction or first path of motion includes rotation about an axis 60 (FIGS. 2, 4 and 5), and the second direction or second path of motion includes axial movement, which is movement parallel to or along the axis 60. Thus, the first path of motion is within a plane 62 (FIG. 4) that is not parallel to the axis 60 of rotation, and which may be perpendicular to the axis, and the second path of motion is parallel to the axis 60 or includes a component that is parallel to the axis. Also in at least some implementations, the retainer 58 is normally in its first position, engaged with or engageable with a stop feature 44 of the housing 26.

To releasably maintain the retainer 58 in the first position, a biasing member, such as a spring 64, may act on the drive member 30 (in this example) in a direction tending to axially move to or keep the retainer 58 in the first position, absent a stronger force tending to move the retainer 58 toward its second position. Accordingly, to move the drive member 30 and change the state of the park lock assembly 12, the retainer 58 must first be moved to its second position. Thus, in the example of FIGS. 2-11, the drive member 30 is first moved axially to disengage the retainer 58 from the housing 26, and then the drive member can be rotated among and between its first and second positions.

In the illustrated example of FIGS. 2-11, the drive member 30 is shown as being generally cylindrical and includes a tool engaging feature 66 positioned along and which may be coaxial with the axis 60, for receipt of a tool 68 (FIGS. 1 and 9-11) by which the drive member is rotated. So that the tool engaging feature 66 is accessible without having to remove the cover 36, the cover includes an opening 70 aligned with the tool engaging feature 66. The same tool 68 may be used to displace the retainer 58 from its first position against the force of the spring 64 to clear the retainer from the stop feature 44 of the housing 26.

Figure 9:
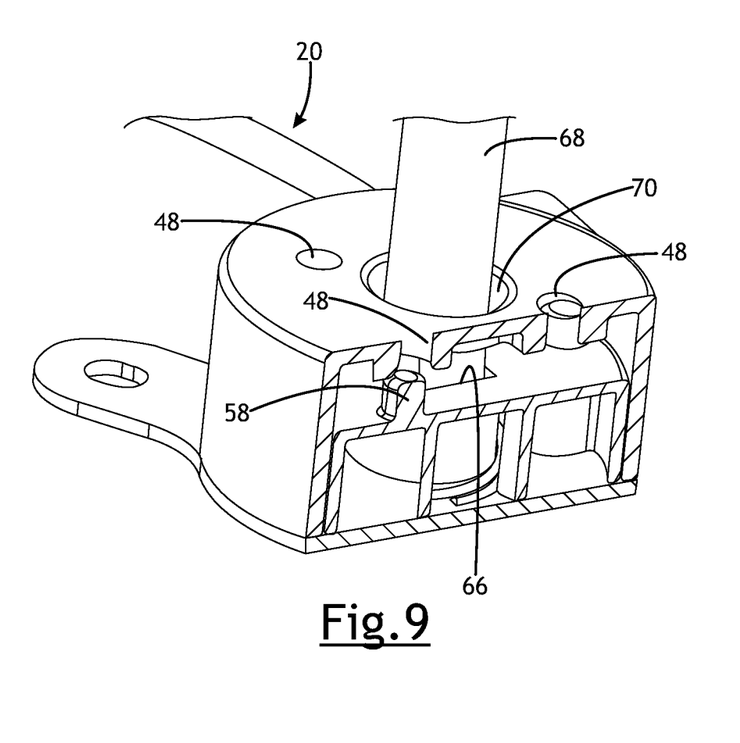
FIG. 9 is a perspective sectional view of the actuator showing a tool actuating the actuator.
Figure 10:
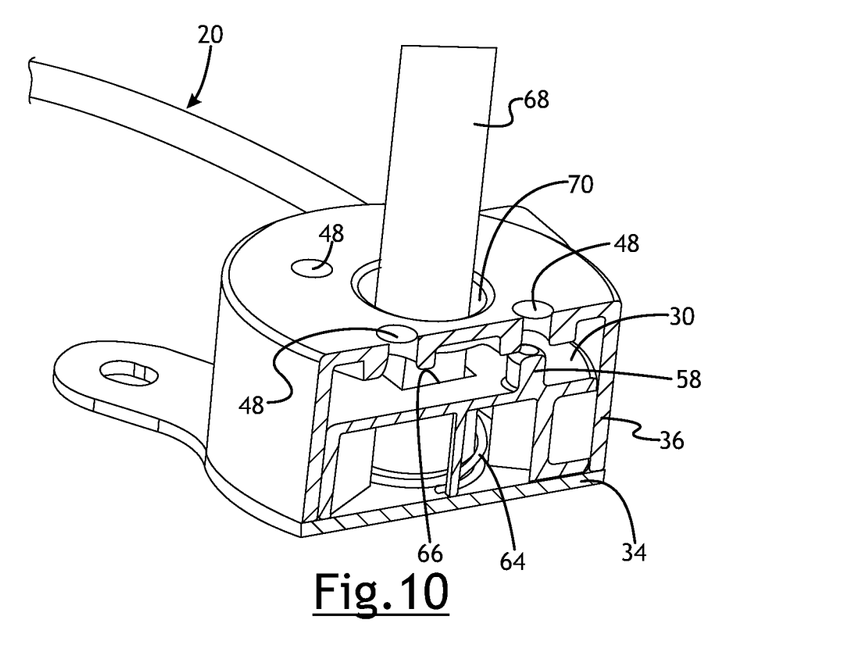
FIG. 10 is a perspective sectional view of the actuator showing the tool actuating the actuator.
Figure 11:
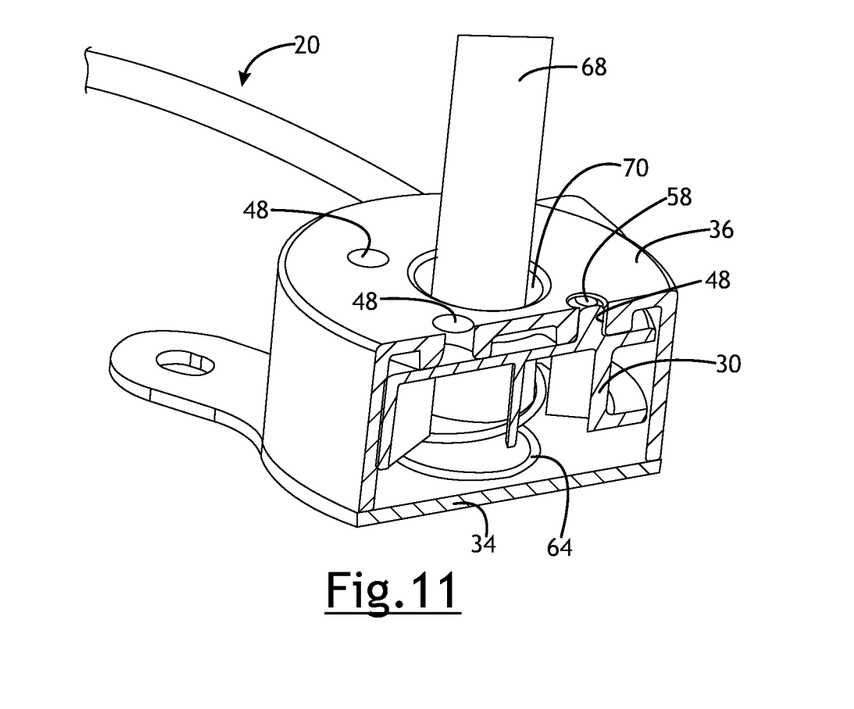
FIG. 11 is a perspective sectional view of the actuator showing the tool actuating the actuator.

In FIG. 9, the tool 68 is received in the tool engaging feature 66 of the drive member 30 and, via the tool, the drive member has been axially displaced to position the retainers 58 in their second position, clear of the stop features/voids 48 in the cover 36. The drive member 30 is still in its first rotary position. In FIG. 10, the drive member 30 is shown in its second rotary position, with the retainers 58 still in their second positions. And in FIG. 11, the drive member 30 is in its second rotary position and the drive member has also moved axially so that the retainers 58/drive member 30 are in their first axial position, received within voids 48 to prevent rotation of the drive member 30. As described above, in FIG. 9, the retainers 58 are received within the first set of voids 48 and in FIG. 11, the retainers are received within the second set of voids 48. Thus, the vehicle transmission 10 may be shifted out of park moved or towed with the park lock assembly 12 disengaged, and without the secondary actuator inadvertently returning to or toward its first position in which the park lock assembly is engaged. To re-engage the park lock assembly 12, the tool 68 is reinserted into the tool engaging feature 66, the retainers 58/drive member 30 are moved to the second axial position against the force of the biasing member 64, and then the drive member is rotated to its first rotary position.

Figure 12:
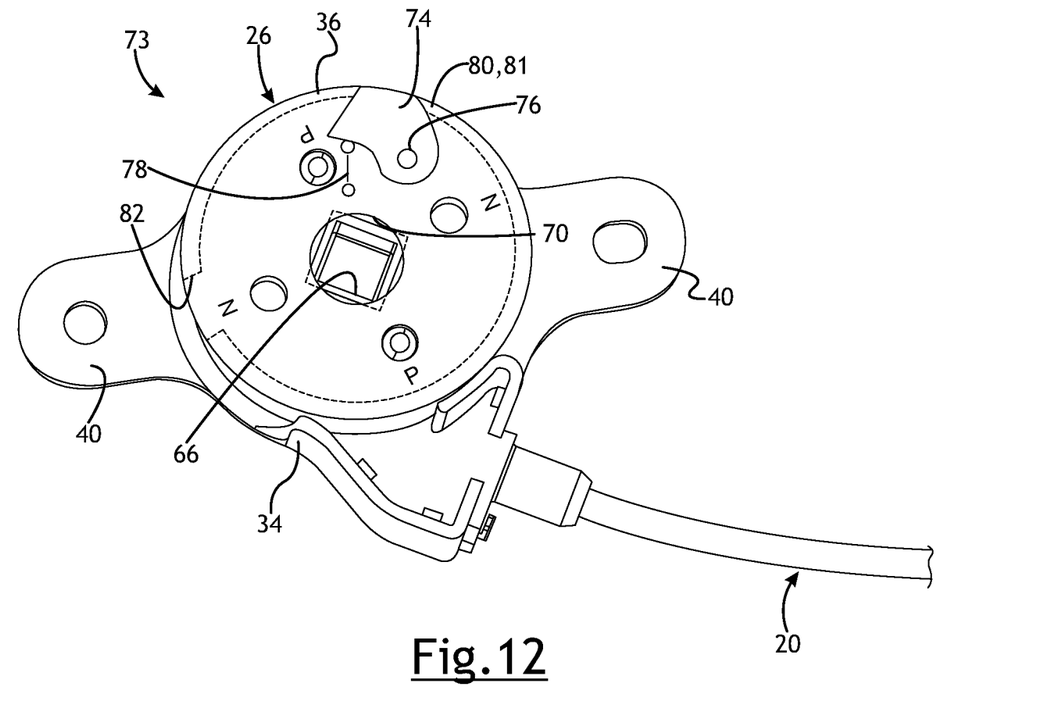
FIG. 12 is a perspective view of a secondary actuator with a pivoted retainer.

While FIGS. 2-11 illustrate retainers 58 and stop features 44 that are axially oriented, FIG. 12 illustrates a drive member 30 with a retainer that is radially oriented. Certain features of the drive member 30 and other components of the secondary actuator 73 shown in FIG. 12, as well as in FIGS. 13-17, are different from the drive member 30 and secondary actuator 14 shown in FIGS. 1-11, but the same reference numerals are used for certain of the components to facilitate further description and understanding of these additional embodiments.

In the secondary park lock actuator 73 of FIG. 12, the retainer 74 is a body that is carried by the drive member 30 for pivoted movement or rotation about a post having an axis 76 that is parallel to the drive member axis of rotation 60. A biasing member, such as a spring 78 or flexible strip of material, yieldably biases the retainer 74 in a first direction to its first position wherein a portion of the retainer extends into an opening 80 in the housing 26 (e.g. the cover 36). In the first position, the retainer 74 also radially overlaps and engages a stop feature 81 of the housing (e.g. a surface bounding the opening 80). Attempted rotation of the drive member 30 is resisted or prevented by engagement of the retainer 74 with the housing 26 within the opening 80. To permit rotation of the drive member 30, the retainer 74 is moved at least partially out of the opening 80 (e.g. rotated in the second direction about the axis 76) to its second position so that the retainer does not engage the housing in a manner that prevents rotation of the drive member. Then, the drive member 30 may be rotated with a tool 68 received within the tool engaging feature 66. When the drive member 30 is fully rotated to the other position, the retainer 74 is aligned with a second opening 82 in the housing 26 and the biasing member 78 urges the retainer at least partially into the second opening 82 to retain the drive member 30 in that position. Thus, the retainer 74 is automatically reset into its first position when the drive member 30 is fully moved to either the first or second position. In this example, the paths of motion of the retainer 74 and the drive member 30 are parallel (e.g. within planes that are parallel to each other). Axial movement of the drive member 30 is not needed to move the retainer relative to the stop feature(s). This arrangement allows the core 28 to be moved without altering the position and/or alignment of the cable conduit 22 with the point of connection between the core and the drive member 30 which occurs when the drive member moves axially, absent relative movement between the core fitting and the drive member. Thus, the core 28 can be maintained in a desired alignment with the cable conduit 22 during actuation of the secondary actuator 73. Also, the retainer 74 is not fixed to the drive member 30 so the retainer may move relative to and independently of the drive member, as noted.

The retainer shown in FIG. 12 could instead be carried by or mounted to the housing 26, and a stop surface engaged by the retainer in its first position could be defined in or by the drive member 30. The drive member 30 may include two stop surfaces that are spaced apart and arranged so that the retainer engages one stop surface in the first position of the drive member and the retainer engages the other stop surface engages in the second position of the drive member.

Figure 13:
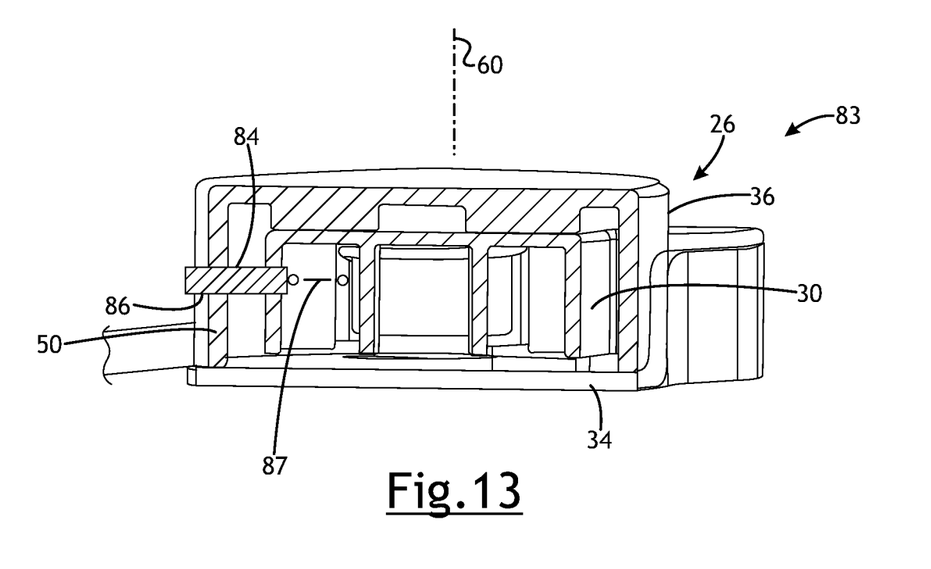
FIG. 13 is a sectional view of an actuator with a radially moving retainer.

In FIG. 13, a secondary park lock actuator 83 includes a retainer 84 that is carried by the drive member 30 and is slidably movable relative to the drive member along a path that is perpendicular to the drive member axis of rotation 60. The retainer 84, in this embodiment, has a first position in which the retainer extends radially outwardly from the drive member 30 for receipt at least partially in an opening 86 in the sidewall 50 of the housing cover 36. In this position, rotation of the drive member 30 is prevented or at least inhibited by engagement of the retainer with the housing cover (e.g. a stop feature of the cover defined by a surface bounding the opening 86). The retainer 84 is radially movable to a second position, which may occur against the force of a biasing spring 87, in which the retainer 84 is received within the housing cover 36, that is, the retainer 84 does not radially overlap or engage the cover 36.

Here again, the paths of motion of the retainer 84 and drive member 30 are parallel (e.g. within planes that are parallel to each other). Of course, the retainer could be movable along a different path, at any angle from the housing cover 36 between a first position in which a stop feature of the housing interferes with or is engaged by the retainer upon attempted rotation of the drive member 30, to a second position in which the housing 26 does not interfere with rotation of the drive member. Also, axial movement of the drive member 30 is not necessary in this implementation, but could be used, if desired. For example, the drive member 30 could also include one retainer 58 as shown in FIGS. 2-11 so that the sliding retainer 84 needs to be moved inwardly, and then the drive member 30 needs to be moved axially to remove the other retainer 58 from an opening 48 in the housing 26 before the drive member 30 can be rotated. This would provide two separate retainers 58, 84 and further prevent unintended or accidental movement of the drive member 30. Such an arrangement could also be used, for example, with the actuator 73 shown in FIG. 12, if desired.

Figure 14:
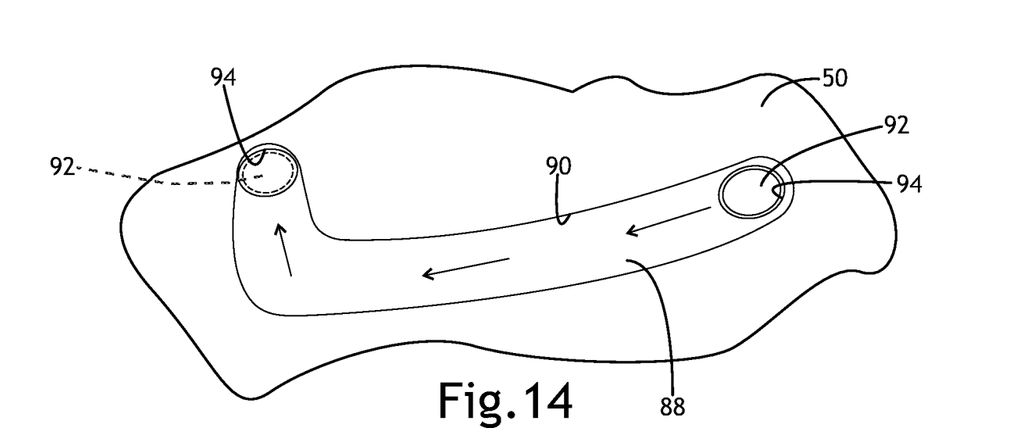
FIG. 14 is a view of a portion of a sidewall of a housing showing a slot and cam surface of the housing.

FIG. 14 shows a portion of the sidewall 50 of a modified housing cover 36 that includes a slot 88 with an inclined cam surface 90. A retainer 92 may be carried by or otherwise coupled to the drive member 30 and may extend into or otherwise be engaged with the slot 88. As the drive member 30 is rotated, the cam surface 90 axially displaces the retainer 92 and drive member 30 to which the retainer is connected, so that both rotary and axial displacement of the drive member 30 occur upon rotation of the drive member. Openings 94 may be provided at either end of the slot 88 and the retainer 92 may be yieldably biased outwardly to a first position so that when the retainer is aligned with an opening 94, the retainer is urged outwardly and a portion of the retainer is received within the opening. In such implementations, to rotate the drive member 30, the retainer 92 is pressed inwardly, to a second position, so that it is clear or sufficiently clear of the opening 94.

Figure 15:
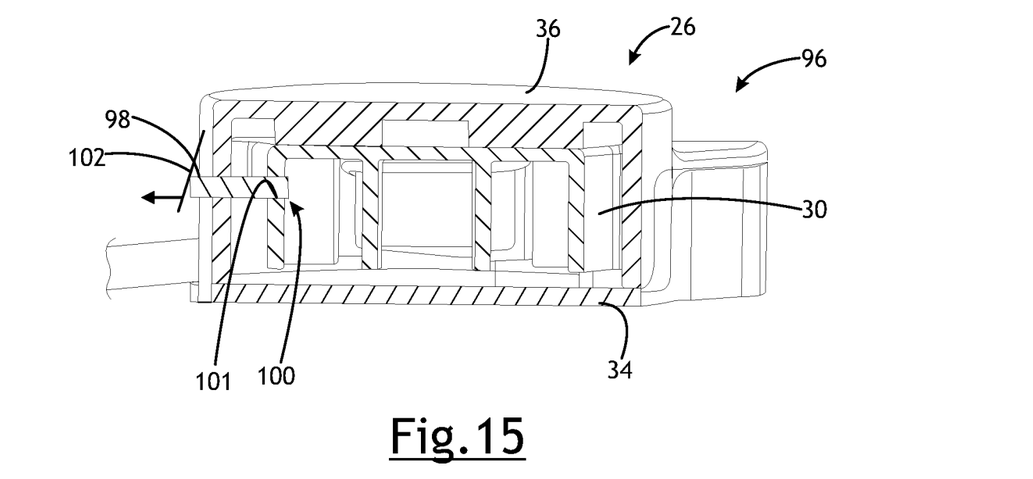
FIG. 15 is a sectional view of an actuator with a radially moving retainer that is carried by the housing.

A secondary park lock actuator 96 as shown in FIG. 15 is similar to the actuator 83 shown in FIG. 13, however, the retainer 98 is carried by the housing 26 instead of being carried by the drive member 30. Hence, the stop feature 100 that the retainer 98 engages in its first position is a surface or part of the drive member 30. In at least some implementations, the retainer 98 moves radially relative to the drive member 30 and housing 26. To permit rotation of the drive member 30, the retainer 98 is moved away from the drive member 30, and in this implementation, the retainer 98 is moved radially outwardly (relative to the drive member axis of rotation 60) to it second position until the retainer is out of the path of motion of the drive member.

The stop surface 100 may be defined by an opening 101 in the drive member 30 into which the retainer 98 extends. The drive member 30 may include two openings 101 or stop surfaces 100 that are rotationally or circumferentially spaced apart. A first opening/stop surface receives or engages the retainer 98 in the first position of the drive member 30 and a second opening/stop surface receives or engages the retainer in the second position of the drive member. In this way, the drive member 30 can be positively but releasably retained in both of its first and second positions, if desired. A biasing member 102 could yieldably urge the retainer 98 to or toward its first position so that the retainer automatically advances into an aligned opening 100 of the drive member 30 unless a greater force acts on the retainer. While the retainer 98 is shown as moving radially between its two positions, a retainer carried by the housing may move in any direction toward and away from the drive member 30, as desired.

Figure 16:
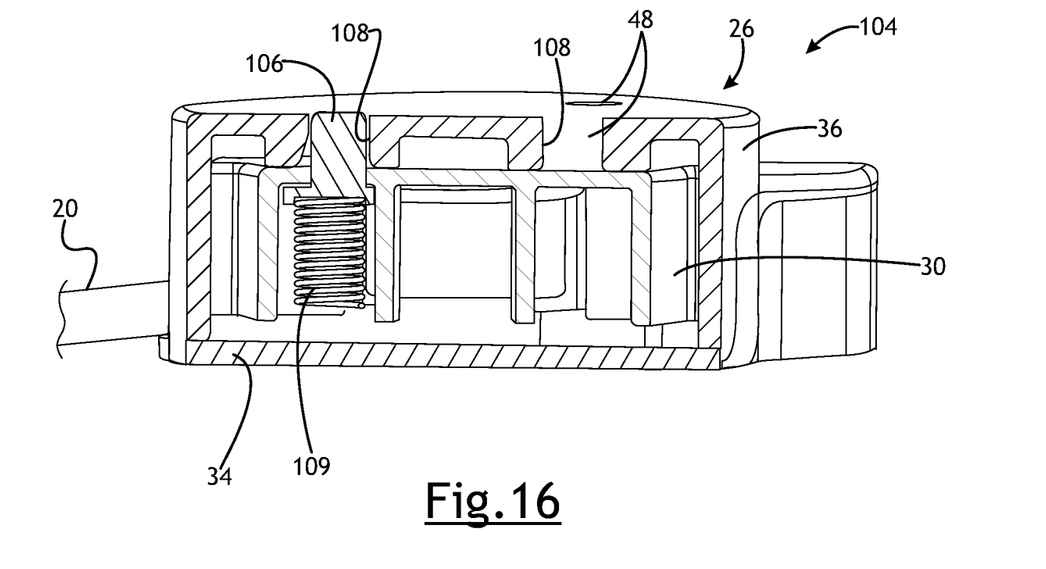
FIG. 16 is a sectional view of an actuator with an axially moving retainer.

The secondary park lock actuator 104 shown in FIG. 16 is similar to the actuator shown in FIGS. 2-11 in that the retainer 106 is carried by the drive member 30 and extends and moves axially relative to the housing 26. In this implementation, the retainer 106 is movably carried by the drive member 30 which means that the retainer may move relative to the drive member but the retainer moves with the drive member when the drive member is moved. The retainer 106 is shown in its first position in FIG. 16, interferingly engaged with a stop feature 108 (e.g. a surface) of the housing 26 to prevent rotation of the drive member 30. More than one stop feature 108 may be provided, and the stop features may be defined by openings 48 in the housing cover 36, the same as or similar to the opening 48 provided in the actuator 14. To rotate the drive member 30, the retainer 106 must be axially displaced relative to the drive member 30 to a second position, clear of the housing 26. Then, the drive member 30 can be rotated to its other position, without having to axially displace the drive member. A biasing member, such as a spring 109, may urge the retainer 106 toward its first position so that the retainer automatically returns to its first position when aligned with an opening 48 in the housing 26. Like the retainer 98 shown in FIG. 15, the retainer 106 shown in FIG. 16 could be carried by the housing 26 instead of the drive member 30. The retainer 106 could then be pulled axially away from the drive member 30 to permit rotation of the drive member, and the biasing member 109 would resist such movement. Axial movement of the drive member 30 itself is not needed in this implementation, but could be utilized or allowed to occur, if desired.

Figure 17:
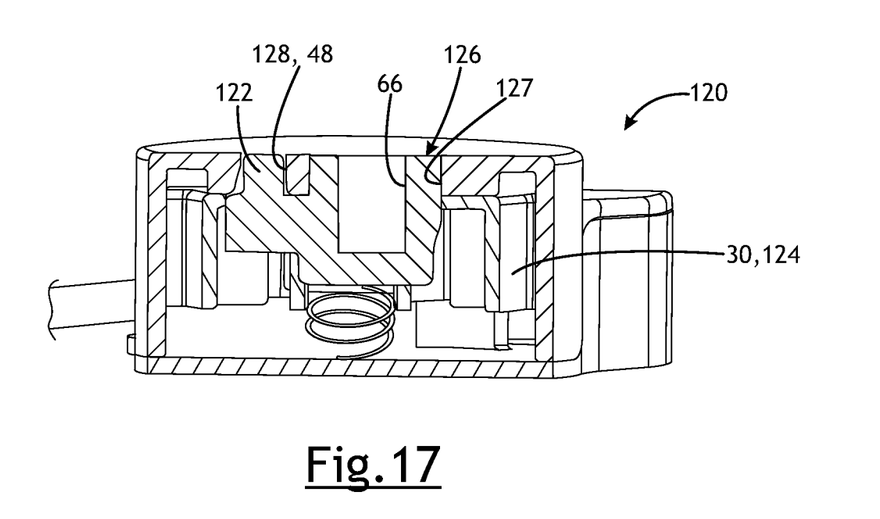
FIG. 17 is a sectional view of an actuator with a body that defines a tool engaging feature and a retainer, and which moves axially relative to the drive member.

A secondary park lock actuator 120 as shown in FIG. 17 is similar to the actuator 104 shown in FIG. 16 in that the retainer 122 is axially movable relative to the drive member 30 and also moves with the drive member 30 when the drive member is rotated. In this example, the drive member 30 includes a first body 124 to which the cable core 28 is connected and a second body 126 that is carried by the first body 124 and which is axially movable relative to the first body. The second body 126 includes or carries both the retainer 122 and the tool engaging feature 66. In the example shown, the first body 124 includes a cavity 127 in which the complementarily or at least somewhat complementarily shaped second body 126 is slidably received. The bodies 124, 126 may be radially overlapped or otherwise coupled so that they rotate together. That is, rotation of the second body 126 also causes rotation of the first body 124. Of course, other arrangements may be used to couple together the first and second bodies 124, 126, as desired. In at least some implementations, the first body 124 of the drive member 30 does not move in two directions, or with two distinct movements (e.g. axial and then rotary movement). Instead, the second body 126 is moved axially relative to the first body 124 to release the retainer 122 from the stop feature 128 (which may be defined by openings 48 in the housing cover 36). Then, the second body 126 and first body 124 are rotated together to change the position of the drive member 30.

Figure 18:
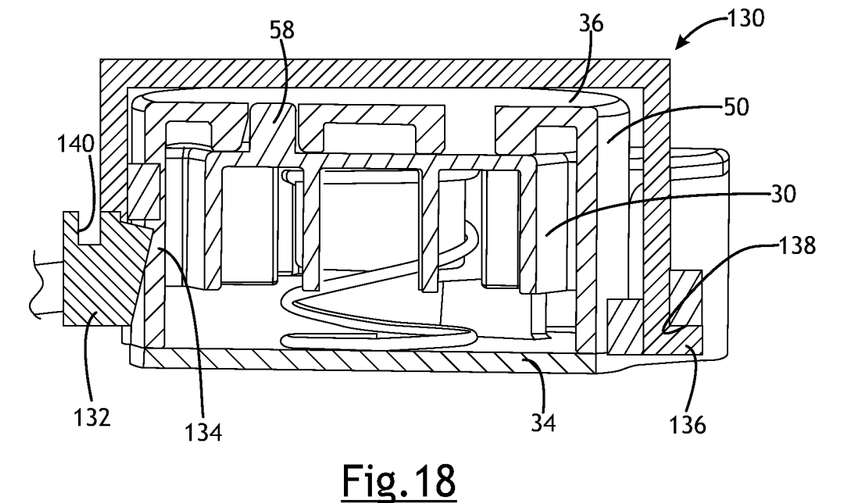
FIG. 18 is a sectional view showing an actuator with an outer cover.

To prevent the secondary park lock actuator 14, 73, 83, 96, 104, 120 from becoming fouled by contaminants, an outer cover 130 may be received over all or part of the actuator housing 26. In the example shown in FIG. 18, the outer cover 130 surrounds the housing cover 36 and includes a tab 132 inserted into an opening 134 in the housing cover sidewall 50, and a flange 136 that may be received within a channel or slot 138 in the base 34 to retain the outer cover 130 in position on the housing 26. A tool cavity 140 in the outer cover 130 permits a portion of the outer cover 130 to be pried or otherwise outwardly displaced to remove the tab 132 from the opening 134 and allow the outer cover 130 to be removed from the housing 26. The tool engaging feature 66 is then exposed and a tool 68 may be inserted therein to actuate the drive member and/or retainer.

Figure 19:
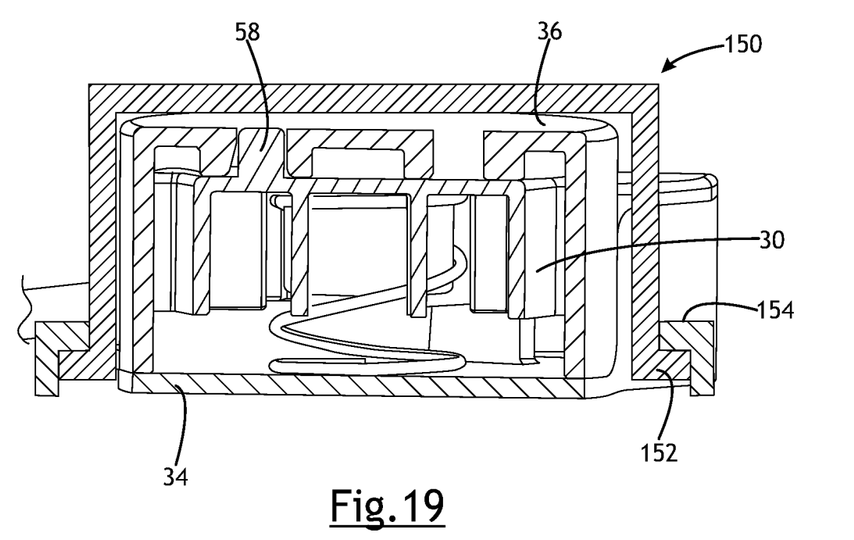
FIG. 19 is a sectional view showing an actuator with an outer cover.

FIG. 19 illustrates an outer cover 150 that surrounds at least part of and up to all of the housing cover 36, and which includes a circumferentially extending rim 152 or separate, spaced apart tabs that extend outwardly from the outer cover 150 and are overlapped by flanges 154 of the base 34. The outer cover 150 may be squeezed inwardly to radially displace at last part of the rim 152 or tabs so that they are not overlapped by the flanges 154, and the outer cover 150 can then be pulled off of the base 34 to expose the tool engaging feature 66.

Figure 20:
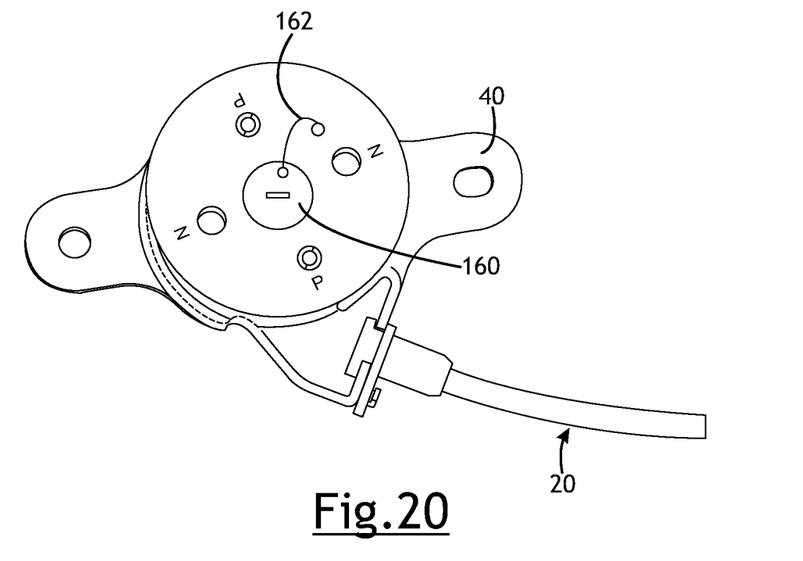
FIG. 20 is a perspective view of an actuator showing an outer cover in the form of a plug.

In FIG. 20, the outer cover is defined by a plug 160 that is complementary in shape and is pressed into the tool engaging feature 66 of the drive member 30. The plug 160 is pried or pulled out of the drive member 30 to permit access to the tool engaging feature 66 by a tool 68. If desired, a tether 162 may be coupled to the housing 26 (e.g. the cover 36) at one end and to the plug 160 at its other end to facilitate pulling the plug out of the drive member 30 and to prevent the plug from becoming separated from the drive member and lost after the plug is removed from the tool engaging feature 66.

Figure 21:
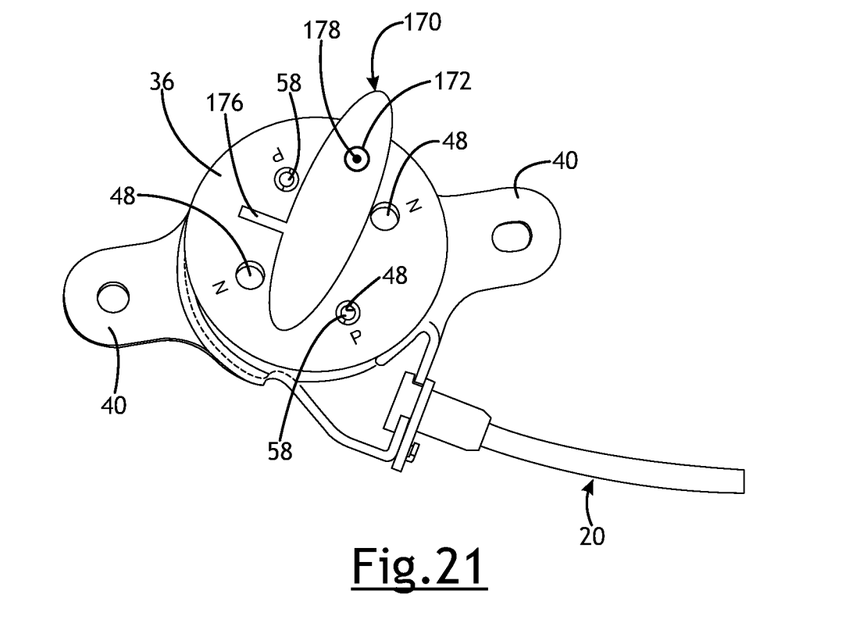
FIG. 21 is a perspective view of an actuator showing an outer cover in the form of a rotatable body.

In FIG. 21, the outer cover 170 overlies the tool engaging feature 66 and prevents contaminants from collecting in the tool engaging feature. The outer cover 170 is rotatably carried by the housing, such as by a post or pin 172 received in an opening of the housing 26, so that the outer cover 170 may be rotated away from the tool engaging feature 66 when desired. A stop member 176 may be movably carried by the housing 26 and in a first position the stop member 176 blocks rotation of the outer cover 170 to prevent inadvertent movement of the outer cover. The stop member 176 may be moved to a second position (e.g. axially pressed or otherwise displaced) to permit the outer cover 170 to be rotated away from the tool engaging feature 66. Instead of a stop member 176, a spring may be provided to yieldably bias the outer cover to its first position, such that a force is required to move the outer cover to its second position against the spring force before the tool engaging feature 66 is exposed. The axis of rotation 178 of the outer cover 170 may be parallel to and offset from the drive member axis of rotation 60.

Figure 22:
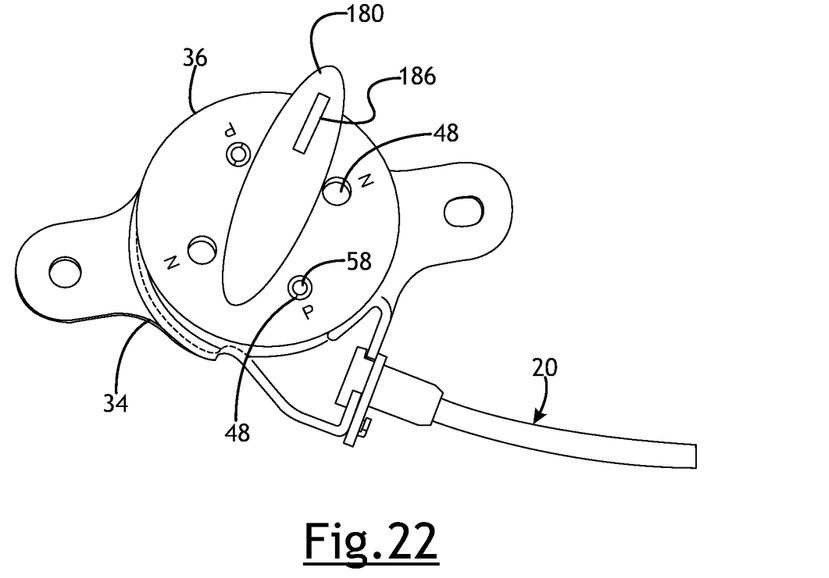
FIG. 22 is a perspective view of an actuator showing an outer cover in the form of a rotatable body.
Figure 23:
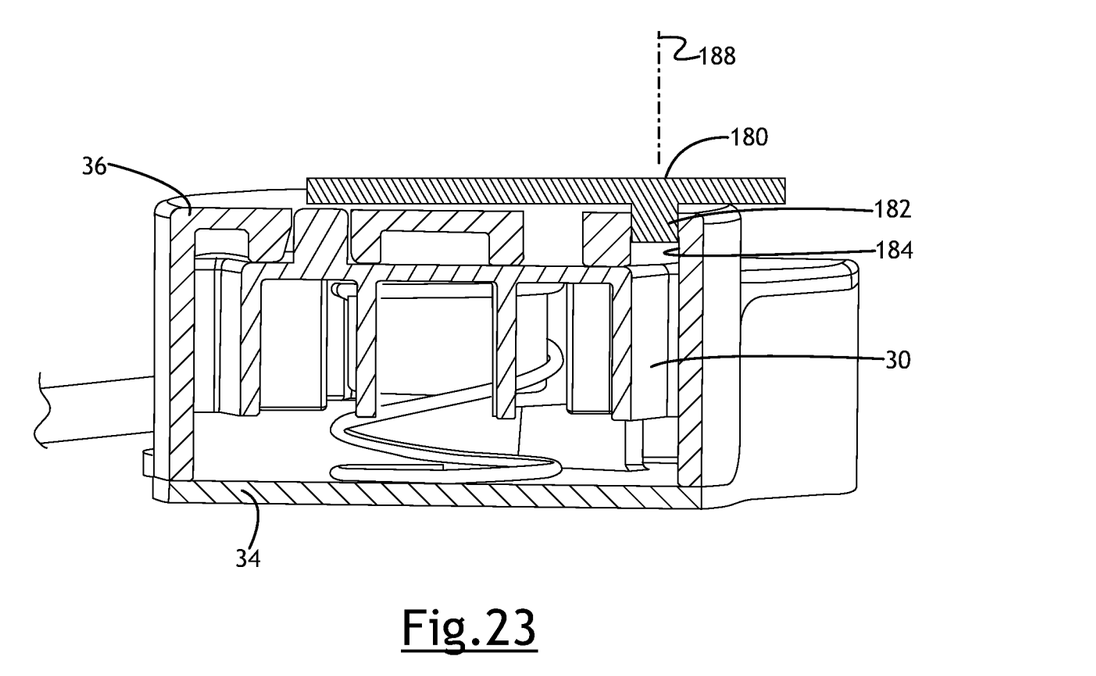
FIG. 23 is a sectional view of the actuator of FIG. 22.

In FIG. 22, the outer cover 180 overlies the tool engaging feature 66 and prevents contaminants from collecting in the tool engaging feature. The outer cover 180 is rotatably carried by the housing 26, such as by a post or pin 182 received in an opening 184 of the housing 26 (FIG. 23), so that the outer cover 180 may be rotated away from the tool engaging feature 66 when desired. To facilitate rotation of the outer cover 180, it includes a slot or other tool engaging feature 186 by which a tool may be used to rotate the outer cover 180 to the second position wherein the tool engaging feature 66 of the drive member 30 is exposed. The slot or other tool engaging feature 186 may be arranged coaxially with the axis of rotation 188 of the outer cover 180, which may be parallel to but offset from the drive member axis of rotation 60.

Thus, the secondary park lock actuator may be manually manipulated to change the state of the park lock assembly as desired. The state of the park lock assembly may be maintained in either its engaged or disengaged position by positively retaining the position of the drive member of the secondary park lock actuator in both its first and second positions. This prevents inadvertent changing of the state of the park lock assembly and allows for predictable actuation and use of the park lock assembly. To retainer the drive member in its two positions, in at least some implementations, the housing includes a first void in which a retainer is received when the drive member is in its first position, and a second void in which the retainer is received when the drive member is in its second position.

In at least some implementations, two separate or independent movements may be required to permit changing the position of the drive member. In at least some implementations, before the drive member can be moved from one position to the other position, a retainer carried by the drive member must be moved from a first position to a second position. Thereafter, the drive member can be moved, e.g. rotated, to displace the cable core and change the state of the park lock assembly. In some implementations, the retainer may be fixed to and not movable relative to the drive member and in other implementations, the retainer may be moved relative to the drive member. Thus, at least one of the retainer and the drive member moves relative to the housing in a direction different from the rotation of the drive member so that the retainer has a first position in which the retainer engages the housing to inhibit or prevent rotation of the drive member and the retainer has a second position in which the drive member may rotate relative to the housing.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A park lock release actuator, comprising:
a housing;
a drive member received at least partially within the housing for rotation about an axis relative to the housing between a first position and a second position; and
a retainer having a first position in which rotation of the drive member is prevented and a second position in which rotation of the drive member is permitted, and wherein at least one of the retainer and the drive member moves relative to the housing in a direction different from the rotation of the drive member so that the path of motion of the retainer between the first position and second position of the retainer is different from the path of motion of the drive member between the first position and second position of the drive member, wherein the retainer is fixed to the drive member, and the drive member is movable axially relative to the housing.

2. The actuator of claim 1 wherein the drive member has a tool engaging feature coaxial with the axis of rotation of the drive member.

3. The actuator of claim 1 wherein the retainer moves relative to the drive member.

4. The actuator of claim 3 wherein the retainer moves one of axially or radially or rotates/pivots relative to the drive member.

5. The actuator of claim 1 wherein the retainer has a cam surface that displaces the retainer from the first position to the second position as the drive member is rotated.

6. The actuator of claim 1 wherein the retainer is fixed to the drive member, and the housing includes a cam surface that engages the retainer to, as the drive member is rotated, drive the drive member in said direction different from rotation of the drive member.

7. The actuator of claim 1 which also comprises a cable having a conduit and a core received within the conduit, and the core is connected to the drive member so that the core is moved relative to the conduit when the drive member rotates relative to the housing.

8. The actuator of claim 1 which also comprises a biasing member that opposes movement of at least one of the retainer and the drive member in said direction different from rotation.

9. The actuator of claim 8 wherein the retainer is fixed to the drive member and the biasing member engages the drive member.

10. The actuator of claim 8 wherein the retainer moves relative to the drive member and the biasing member acts on the retainer.

11. The actuator of claim 1 wherein the retainer is carried by the housing and the drive member includes a stop surface selectively engageable with the retainer when the retainer is in the first position and the drive member is in the first position.

12. The actuator of claim 11 wherein the drive member includes a second stop surface engageable with the retainer when the retainer is in the first position and the drive member is in the second position.

13. A park lock release actuator, comprising:
a housing;
a drive member received at least partially within the housing for rotation about an axis relative to the housing between a first position and a second position; and a retainer having a first position in which rotation of the drive member is prevented and a second position in which rotation of the drive member is permitted, and wherein at least one of the retainer and the drive member moves relative to the housing in a direction different from the rotation of the drive member so that the path of motion of the retainer between the first position and second position of the retainer is different from the path of motion of the drive member between the first position and second position of the drive member,
wherein the housing includes a first void in which the retainer is received when the drive member is in its first position, and a second void in which the retainer is received when the drive member is in its second position.

14. A park lock release actuator, comprising:
a housing;
a drive member received at least partially within the housing for rotation about an axis relative to the housing between a first position and a second position, and the drive member has a tool engaging feature coaxial with the axis of rotation of the drive member; and
a retainer having a first position in which rotation of the drive member is prevented and a second position in which rotation of the drive member is permitted, and wherein at least one of the retainer and the drive member moves relative to the housing in a direction different from the rotation of the drive member so that the path of motion of the retainer between the first position and second position of the retainer is different from the path of motion of the drive member between the first position and second position of the drive member, wherein the retainer is carried by the drive member.

15. The actuator of claim 14 wherein the retainer is carried by the housing.

* * * * *